US010725600B2

(12) United States Patent
Saai et al.

(10) Patent No.: US 10,725,600 B2
(45) Date of Patent: Jul. 28, 2020

(54) POSITION INPUT DEVICE AND DISPLAY DEVICE WITH POSITION INPUT FUNCTION

(71) Applicant: Sharp Kabushiki Kaisha, Sakai, Osaka (JP)

(72) Inventors: Yuhji Saai, Sakai (JP); Kohji Yabuta, Sakai (JP); Takeshi Kameda, Sakai (JP); Ryo Matsuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/434,351

(22) Filed: Jun. 7, 2019

(65) Prior Publication Data

US 2019/0391705 A1    Dec. 26, 2019

Related U.S. Application Data

(60) Provisional application No. 62/687,374, filed on Jun. 20, 2018.

(51) Int. Cl.
*G06F 3/044*    (2006.01)
*G06F 3/041*    (2006.01)

(52) U.S. Cl.
CPC .......... *G06F 3/0446* (2019.05); *G06F 3/0412* (2013.01); *G06F 2203/04112* (2013.01)

(58) Field of Classification Search
CPC ................. G06F 3/0446; G06F 3/0412; G06F 2203/04112; G06F 3/04164; G06F 3/0445
See application file for complete search history.

(56) References Cited

U.S. PATENT DOCUMENTS

| 2013/0169548 | A1* | 7/2013 | Kim | G06F 3/044 |
| | | | | 345/173 |
| 2017/0185187 | A1* | 6/2017 | Nakayama | G06F 3/044 |
| 2018/0035541 | A1* | 2/2018 | Kamijo | G02F 1/136227 |
| 2018/0113557 | A1* | 4/2018 | Noguchi | G06F 3/044 |
| 2018/0120971 | A1* | 5/2018 | Lee | G06F 3/044 |

FOREIGN PATENT DOCUMENTS

JP    2017-227983 A    12/2017

* cited by examiner

*Primary Examiner* — Andrew Sasinowski
(74) *Attorney, Agent, or Firm* — Keating & Bennett, LLP (57) ABSTRACT

A position input device includes electrodes formed of metal with a belt-like shape, extended along a first direction, and arranged with a space therebetween along a second direction that is orthogonal to the first direction, lines each electrically connected to one end of each of the electrodes in the first direction to receive a signal, dummy electrodes formed of metal with a belt-like shape and each disposed in a space between the electrodes that are adjacent, and dummy lines each coupled to an end of each of the dummy electrodes in the first direction in an electrically disconnected state. The electrodes, the lines, the dummy electrodes, and the dummy lines each include a front side surface and a back side surface in a plane along the first direction and the second direction, and at least one of the front side surface and the back side surface is blackened.

8 Claims, 6 Drawing Sheets

POSITION INPUT DEVICE AND DISPLAY DEVICE WITH POSITION INPUT FUNCTION

CROSS REFERENCE TO RELATED APPLICATION

This application claims priority from U.S. Provisional Application No. 62/687,374 filed on Jun. 20, 2018. The entire contents of the priority application are incorporated herein by reference.

TECHNICAL FIELD

The technology disclosed herein relates to a position input device and a display device with a position input function.

BACKGROUND

In recent years, electronic devices such as a tablet type laptop computer and a mobile information terminal have come to incorporate a touch panel in order to improve the operability and usability. On a touch panel, positional information on a display surface of a display panel can be input with a touch of a finger, a stylus pen, or the like. Thus, an intuitive operation by, for example, the user's direct touching on an image displayed in the display panel is possible. One known example of the display panel including the touch panel as described above is disclosed in Patent Document 1 shown below.

In a display device according to Patent Document 1, a touch sensor electrode for detecting a position is formed by arranging a plurality of meshed metal thin lines with a belt-like shape. Specifically, the touch sensor electrode includes a plurality of sensing electrodes formed of a belt-like shaped metal thin line disposed on a front side of a transparent substrate, and a plurality of driving electrodes formed of a belt-like shaped metal thin line disposed on a back side thereof. By detecting the difference in electrostatic capacitance between the sensing electrodes and the driving electrodes, the touch sensor electrode detects whether the touch has been performed. This display device includes the plurality of belt-like shaped sensing electrodes disposed with a space from the adjacent sensing electrode, and includes a dummy electrode in the space in order to solve the difference in visibility between the sensing electrode and the space.

RELATED ART DOCUMENT

Patent Document

[Patent Document 1] Japanese Unexamined Patent Application Publication No. 2017-227983

Incidentally, an electrode formed of a transparent conductive film of ITO, ZnO, or the like or formed of metal such as a metal thin line is usable, and in order to increase the conductivity, the metal electrode is preferred. However, if the electrode is formed of metal, there is a problem that the light, which reflects on the metal, deteriorates the visibility of the display panel. In view of this, a surface of the metal may be blackened through a plating process such as electroless plating, an oxidizing process, or the like. However, there has been a problem that, in the plating process, the blackening becomes inhomogeneous between the electrode and the dummy electrode and bright and dark unevenness is observed in the display panel.

SUMMARY

The technology disclosed herein is to provide a position input device and a display device with a position input function that are excellent in visibility even if metal is used as the electrode.

A position input device according to the technology disclosed herein includes a plurality of electrodes formed of metal with a belt-like shape, extended along a first direction, and arranged with a space therebetween along a second direction that is orthogonal to the first direction; lines each electrically connected to one end of each of the electrodes in the first direction to receive a signal; dummy electrodes formed of metal with a belt-like shape and each disposed in a space between the plurality of electrodes that are adjacent; and dummy lines each coupled to one end of each of the dummy electrodes in the first direction in an electrically disconnected state. The electrodes, the lines, the dummy electrodes, and the dummy lines each include a front side surface and a back side surface in a plane along the first direction and the second direction, at least one of the front side surface and the back side surface being blackened.

By the structure as described above, the total area of the electrodes and the lines connected thereto and the total area of the dummy electrodes and the dummy lines coupled thereto are close; therefore, when the blackening by the plating process is performed, the difference in degree of the blackening (dense or thin) between the electrodes and the dummy electrodes becomes smaller. That is to say, the position input device with excellent visibility and less bright and dark unevenness can be obtained.

According to the technology disclosed herein, the position input device and the display device with a position input function that are excellent in visibility even if metal is used as the electrode can be obtained.

DETAILED DESCRIPTION

One embodiment is described with reference to FIG. 1 to FIG. 5. The present embodiment describes a touch panel (one example of a position input device) 20 included in a liquid crystal display device (one example of a display device with a position input function) 10. Note that an X axis, a Y axis, and a Z axis are shown in a part of each drawing, and each axial direction coincides the direction shown in each drawing. An up-down direction is determined based on FIG. 1 and FIG. 2 and an upper side in these drawings corresponds to a front side and a lower side therein corresponds to a back side.

Figure 1:
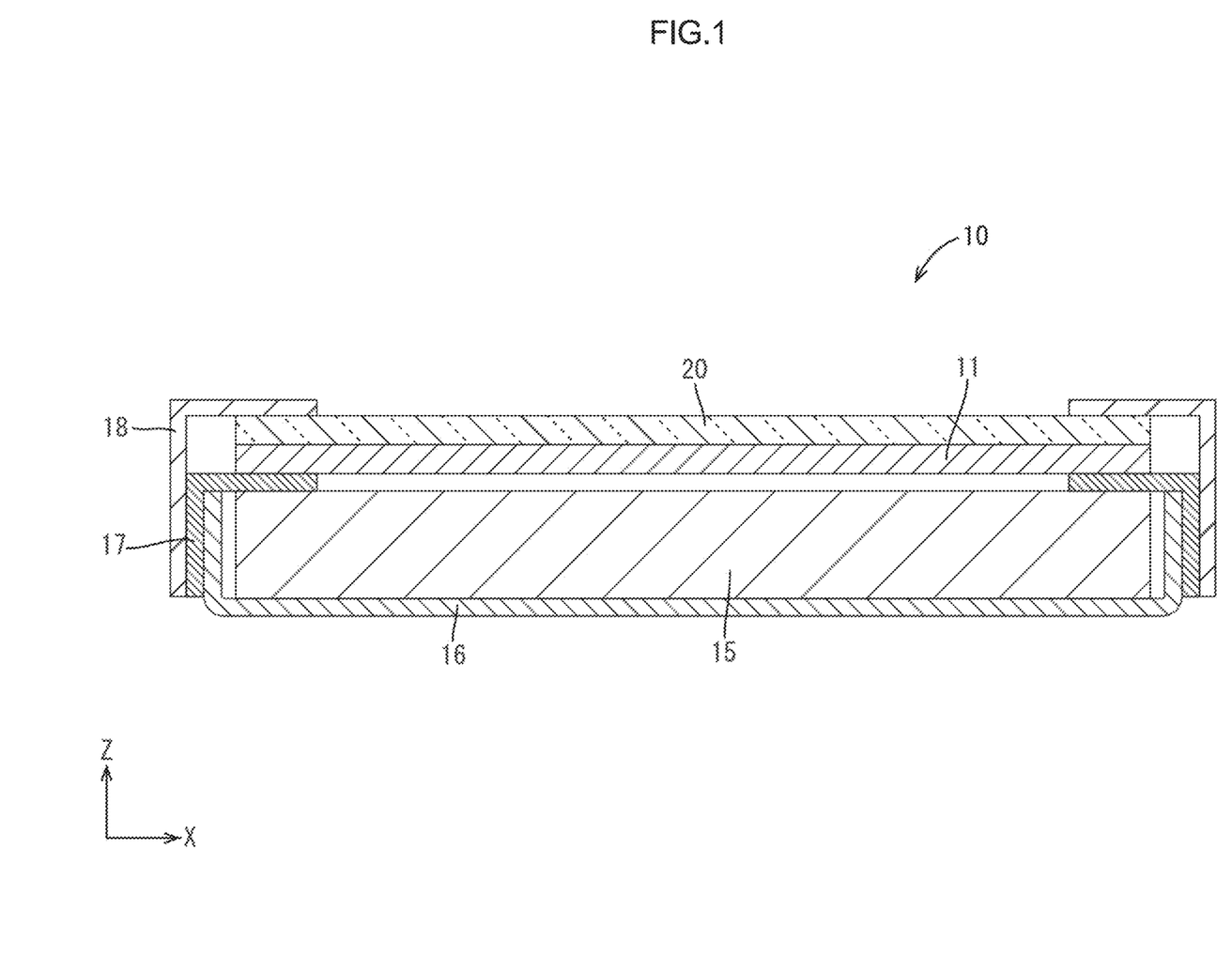
FIG. 1 is a cross-sectional view illustrating a schematic structure of a liquid crystal display device according to one embodiment.

First, a structure of the liquid crystal display device 10 is described. The liquid crystal display device 10 has a vertically long rectangular shape as a whole. As illustrated in FIG. 1, the liquid crystal display device 10 includes a liquid crystal panel 11 corresponding to a display panel that displays an image, the touch panel (position input device) 20 that is used to input positional information within a display surface of the liquid crystal panel 11, and a backlight device 15 corresponding to an external light source that supplies light to the liquid crystal panel 11.

Figure 2:
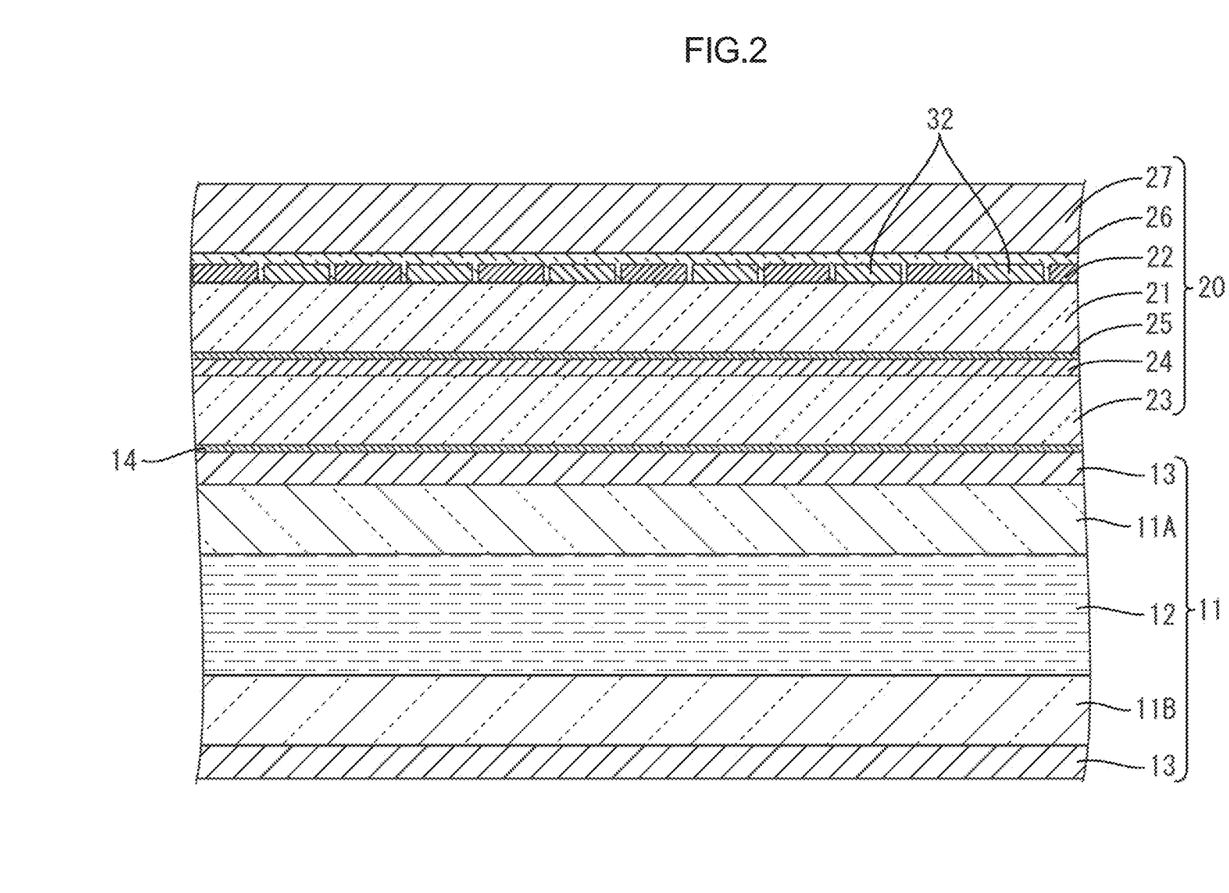
FIG. 2 is a cross-sectional view illustrating a schematic structure of a touch panel and a liquid crystal panel.

The liquid crystal panel 11 and the touch panel 20, which are stacked to face each other, are fixed to each other and unified with an adhesive 14 that is substantially transparent interposed therebetween (see FIG. 2). The liquid crystal display device 10 includes a housing 16 that houses the backlight device 15, a frame 17 that holds the backlight device 15 between the housing 16 and the frame 17, and a bezel 18 that holds the liquid crystal panel 11 and the touch panel 20 between the frame 17 and the bezel 18.

The liquid crystal display device 10 according to the present embodiment is used for various kinds of electronic devices including a mobile information terminal (including an electronic book and the like), a mobile phone (including a smart phone and the like), a laptop computer, and a mobile game machine. Therefore, the liquid crystal panel 11 and the touch panel 20 of the liquid crystal display device 10 have a screen size of about several inches to ten and several inches, which is generally classified into the small or medium small size.

The liquid crystal panel 11 is described. As illustrated in FIG. 2, the liquid crystal panel 11 includes a pair of substrates 11A and 11B made of glass with a vertically long rectangular shape that is transparent (having a light-transmitting property), and a liquid crystal layer 12 held between the substrates 11A and 11B and including liquid crystal molecules whose optical characteristic is changed as an electric field is applied. The substrates 11A and 11B are attached together with a sealant while a gap for the thickness of the liquid crystal layer 12 is maintained between the substrates 11A and 11B. Note that a short-side direction of the liquid crystal panel 11 coincides with an X-axis direction and a long-side direction thereof coincides with a Y-axis direction.

One of the substrates 11A and 11B that is on the front side is a CF substrate 11A and the other on the back side (rear side) is an array substrate 11B. On an inner surface side of the array substrate 11B (on the liquid crystal layer 12 side, facing the CF substrate 11A), a number of TFTs (thin film transistors) as switching elements and pixel electrodes are arranged and around these TFTs and pixel electrodes, gate lines and source lines are disposed in a lattice form to surround. To each line, a predetermined image signal is supplied from a control circuit. The pixel electrode is formed of a transparent electrode of ITO (indium tin oxide) or ZnO (zinc oxide).

On the other hand, on the CF substrate 11A, a number of color filters are arranged at positions corresponding to the pixels. The color filters, which are three colors of R, G, and B, are alternately arranged. Between the color filters, a light-blocking layer (black matrix) is formed to prevent color mixing. On a surface of the color filter and the light-blocking layer, a common electrode is provided to face the pixel electrode on the array substrate 11B side. This CF substrate 11A is slightly smaller than the array substrate 11B.

On each inner surface side of the substrates 11A and 11B, an alignment film for aligning the liquid crystal molecules in the liquid crystal layer 12 is formed. On each outer surface side of the substrates 11A and 11B, a polarizing plate 13 is attached.

Figure 3:
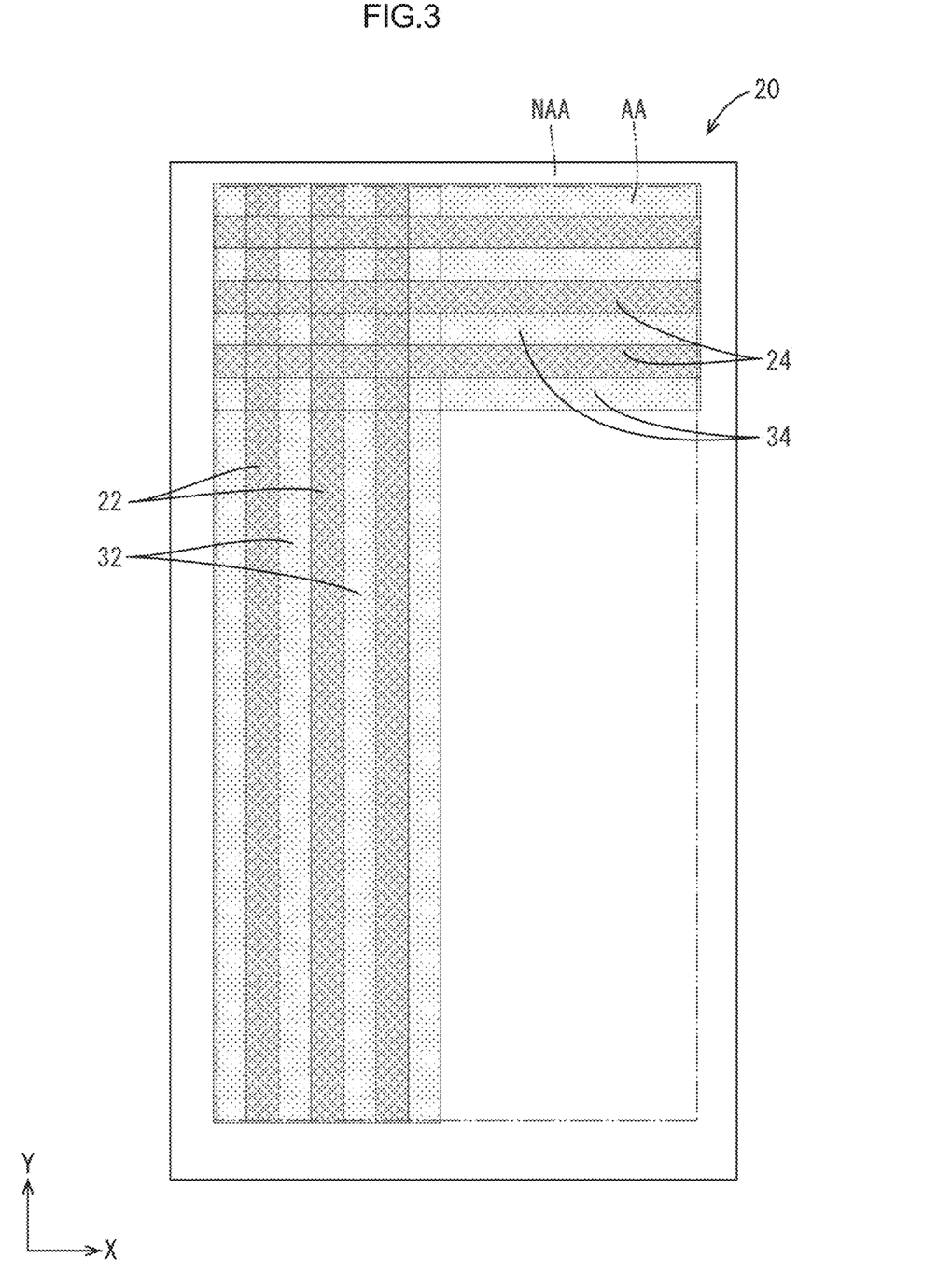
FIG. 3 is a plan view illustrating a schematic structure of detection electrodes and driving electrodes in the touch panel.

The liquid crystal panel 11 is sectioned into a display area AA where an image can be displayed and a non-display area NAA where an image is not displayed. A two-dot chain line in FIG. 3 indicates an area in the touch panel 20 that corresponds to the display area AA in the liquid crystal panel 11. As illustrated in FIG. 3, the display area AA has a rectangular shape and is at a central part of the liquid crystal panel 11. The non-display area NAA is an outer peripheral part with a frame shape that surrounds the display area AA.

Next, before the touch panel 20, the backlight device 15 is described briefly. The backlight device 15 is what is called an edge light type (side light type). The backlight device 15 includes light sources, an approximately box-shaped chassis that opens to the front side (to the liquid crystal panel 11 side, light emission side) and contains the light sources, a light guide member that has the light sources disposed at ends thereof to face each other, and guides the light from the light sources such that the light is emitted to an open part of the chassis, and an optical member that is disposed to cover the open part of the chassis. The light emitted from the light source enters the light guide member from the end, propagates in the light guide member, and is emitted to the open part of the chassis. After that, the light is shaped into planar light with uniform luminance distribution within the surface by the optical member, and then delivered to the liquid crystal panel 11. As the TFTs in the liquid crystal panel 11 are driven, the light transmittance of the liquid crystal panel 11 is controlled selectively in the display surface, and thus, a predetermined image can be displayed on the display surface. Note that the detailed illustration of the light source, the chassis, the light guide member, and the optical member is omitted.

The touch panel 20 is described. The touch panel 20 is used by a user of the liquid crystal display device 10 in a manner that the user inputs positional information (performs a touch operation) in accordance with a display image on the liquid crystal panel 11. The touch panel 20 is disposed to overlap with the liquid crystal panel 11 on the front side (on the side opposite to the backlight device 15). This touch panel 20 is what is called a projection type electrostatic capacitance panel, and its detection method is a mutual capacitance type. Note that the touch panel 20 is not limited to the mutual capacitance type and may be a self-capacitance type. A short-side direction of the touch panel coincides with the X-axis direction and a long-side direction thereof coincides with the Y-axis direction.

This touch panel 20 includes a first transparent substrate 21 formed of a light-transmitting material that is substantially transparent, and a touch panel pattern TPP including detection electrodes (one example of electrodes) 22 disposed on a front side of the first transparent substrate 21 and driving electrodes (one example of counter electrodes) 24 disposed on a side (back side) opposite to the front side. This touch panel pattern TPP is configured to detect whether the position input (touch operation) has been performed, on the basis of the difference in electrostatic capacitance that is caused by the presence or absence of a substance (such as a user's finger) that blocks the electric field formed between the detection electrode 22 and the driving electrode 24.

More specifically, as illustrated in FIG. 2, the touch panel 20 includes the following components in the order from the liquid crystal panel 11 side: a second transparent substrate 23 that is formed of a light-transmitting material that is transparent, the driving electrodes 24, a transparent adhesive layer 25, the first transparent substrate 21, the detection electrodes 22, a transparent adhesive layer 26, and a cover panel 27. As a whole, the touch panel 20 has the light-transmitting property enough to transmit the information that the liquid crystal panel 11 displays.

The detection electrodes 22 and the driving electrodes 24 in the touch panel pattern TPP are disposed to overlap with the display area AA in the liquid crystal panel (see FIG. 3). That is to say, an area in the touch panel that corresponds to the display area AA in the liquid crystal panel 11 is a touch area where the input position can be detected, and the non-display area NAA is a non-touch area where the input position cannot be detected.

In regard to the plurality of detection electrodes 22 and the driving electrodes 24, as illustrated in FIG. 3, the detection electrodes 22 are formed to have a belt-like shape as a whole and are extended along the Y-axis direction that is a first direction. Through these plurality of detection electrodes 22 and insulating layers (the first transparent substrate 21 and the transparent adhesive layer 25), the plurality of driving electrodes 24, which are formed to have a belt-like shape as a whole, are extended along the X-axis direction that is a second direction being orthogonal to the first direction. That is to say, the detection electrodes 22 and the driving electrodes 24 are disposed to overlap in a plan view.

First, the detection electrode 22 is described in detail. The detection electrode 22 is formed to have the belt-like shape that is slightly longer than the long side of the touch area (display area AA). One end of the detection electrode 22 in the long-side direction (lower end in FIG. 3) reaches the non-touch area (non-display area NAA) and is connected to a control circuit board that is a controller of the touch panel 20 through a detection line 28 or the like to be described below. The plurality of detection electrodes 22 are arranged along the X-axis direction with a space with predetermined length from the adjacent detection electrode 22. The space is set to have the same width as, or a slightly larger width than the width of the detection electrode 22 (length in the second direction).

In the space between the plurality of adjacent detection electrodes 22, a dummy detection electrode (one example of dummy electrode) 32 is provided. The dummy detection electrode 32 has a belt-like shape that is extended along the Y-axis direction that is the first direction. The dummy detection electrode 32 is disposed insulated electrically from the detection electrode 22 and fills the space between the adjacent detection electrodes 22. The dummy detection electrode 32 has the same length and width as those of the detection electrode 22.

Figure 4:
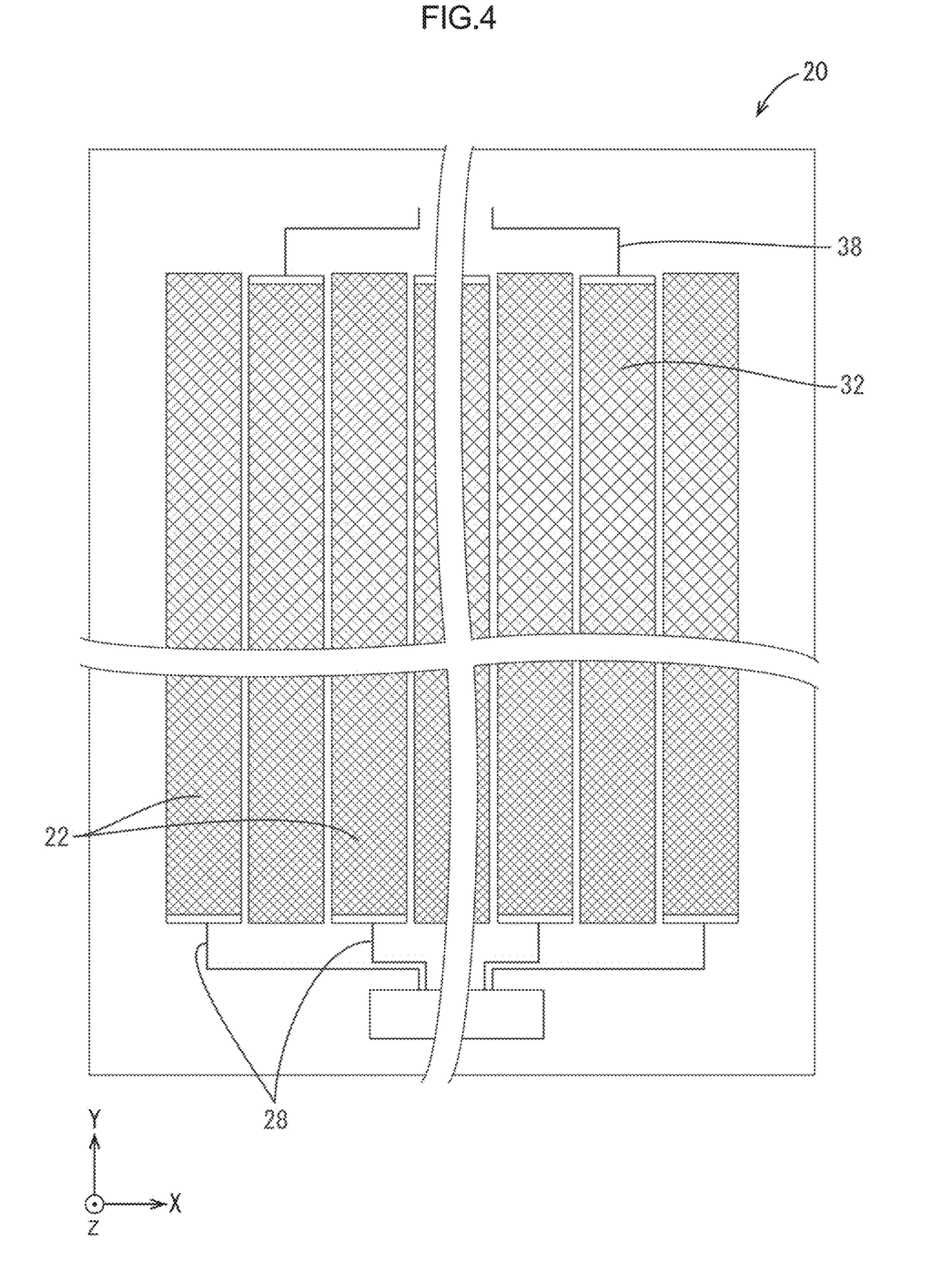
FIG. 4 is a plan view illustrating a schematic structure of a front side of the touch panel.

The detection electrodes 22 have a meshed pattern formed of thin lines of metal with excellent conductivity, such as copper, silver, aluminum, molybdenum, titanium, or tungsten. In addition, the dummy detection electrodes 32 have a meshed pattern formed of thin lines of metal like the detection electrodes 22. The detection electrodes 22 and the dummy detection electrodes 32 are in the equivalent mode. The dummy detection electrodes 32 are preferably formed of the same kind of metal as that of the detection electrodes 22; however, the material of the dummy detection electrodes 32 is not limited thereto. These detection electrodes 22 and dummy detection electrodes 32 can be formed by etching a metal film formed on a plate surface of the first transparent substrate so as to pattern the metal film into a predetermined meshed pattern. Note that FIG. 4 schematically illustrates an example in which the detection electrodes 22 and the dummy detection electrodes 32 are formed to have a lattice mesh shape.

Each of the plurality of detection electrodes 22 has one end in the long-side direction (lower side in FIG. 4) electrically connected to each of a plurality of detection terminals through each of the plurality of detection lines (one example of line) 28 provided in the non-touch area. The plurality of detection terminals are electrically connected to the control circuit board. The plurality of detection lines 28 are drawn in a manner of being extended from the center of the short side of the plurality of detection electrodes 22 with a belt-like shape to a direction perpendicular to the short side, bent along the short side, and collected to a central part of the touch panel 20 in the width direction (X-axis direction). By such a structure, the detection line 28 that is connected to the detection electrode 22 disposed closer to the end side in the width direction of the touch panel 20 is longer, while the detection line 28 that is connected to the detection electrode 22 disposed closer to the central part in the width direction is shorter. Note that the detection lines 28 are preferably formed of the same metal material as that of the detection electrodes 22; however, the material of the detection lines 28 is not limited thereto.

The plurality of dummy detection electrodes 32 are coupled to a plurality of dummy detection lines 38 (one example of dummy line) provided in the non-touch area at the end (upper side in FIG. 4) on the side opposite to the side where the detection lines 28 are disposed in the long-side direction. The plurality of dummy detection lines 38 are, like the detection lines 28, drawn in a manner of being extended from the center of the short side of the plurality of dummy detection electrodes 32 with a belt-like shape to a direction perpendicular to the short side, bent along the short side, and collected to the central part of the touch panel 20 in the width direction (X-axis direction). That is to say, the dummy detection line 38 that is coupled to the dummy detection electrode 32 disposed closer to the end side in the width direction of the touch panel 20 is longer, while the dummy detection line 38 that is coupled to the dummy detection electrode 32 disposed closer to the central part in the width direction is shorter. Note that the dummy detection lines 38 are preferably formed of the same metal material as that of the dummy detection electrodes 32; however, the material of the dummy detection lines 38 is not limited thereto. The dummy detection lines 38 are not connected electrically.

These detection lines 28 and dummy detection lines 38 can be formed by, like the detection electrodes 22 and the dummy detection electrodes 32, etching a metal film formed on a plate surface of the first transparent substrate 21 so as to pattern the metal film into a predetermined pattern. Note that FIG. 4 schematically illustrates a wiring structure of the detection lines 28 and the dummy detection lines 38.

The length of one of the plurality of dummy detection lines 38 is the intermediate length between the lengths of the two detection lines 28 connected to the two detection electrodes 22 adjacent to the dummy detection electrode 32 coupled to the one dummy detection line 38. That is to say, assuming that the length of the detection line 28 connected to one of the detection electrodes 22 that is on the central side in the width direction of the touch panel 20 is L1, the length of the dummy detection line 38 that is coupled to the dummy detection electrode 32 disposed externally adjacent to the detection electrode 22 is L2, and the length of the detection line 28 connected to the detection electrode 22 disposed externally adjacent to the dummy detection electrode 32 is L3, L1<L2<L3 is satisfied. Note that the plurality of detection lines 28 and the plurality of dummy detection lines 38 are set to have the same width.

These detection electrodes 22, detection lines 28, dummy detection electrodes 32, and dummy detection lines 38 have, on each surface thereof (surface opposite to the first transparent substrate 21), a black film formed by a blackening process. The black film is a metal oxide film formed by an oxidizing process or a metal film formed by a plating process.

On the other hand, the driving electrode (one example of counter electrode) 24 is formed to have a belt-like shape that is slightly longer than the short side of the touch area (display area AA). One end of the driving electrode 24 in the long-side direction (right end in FIG. 5) reaches the non-touch area and is connected to the control circuit board that is the controller of the touch panel 20 through a driving line 29 or the like to be described below. The plurality of driving electrodes 24 are arranged along the Y-axis direction with a space with predetermined length from the adjacent driving electrode 24. The space is set to have the same width as, or a slightly larger width than the width of the driving electrode 24 (length in the first direction).

In the space between the plurality of adjacent driving electrodes 24, a dummy driving electrode (one example of counter electrode side dummy electrode) 34 is provided. The dummy driving electrode 34 has a belt-like shape that is extended along the X-axis direction that is the second direction. The dummy driving electrode 34 is disposed insulated electrically from the driving electrode 24 and fills the space between the adjacent driving electrodes 24. The dummy driving electrode 34 has the same length and width as those of the driving electrode 24.

Figure 5:
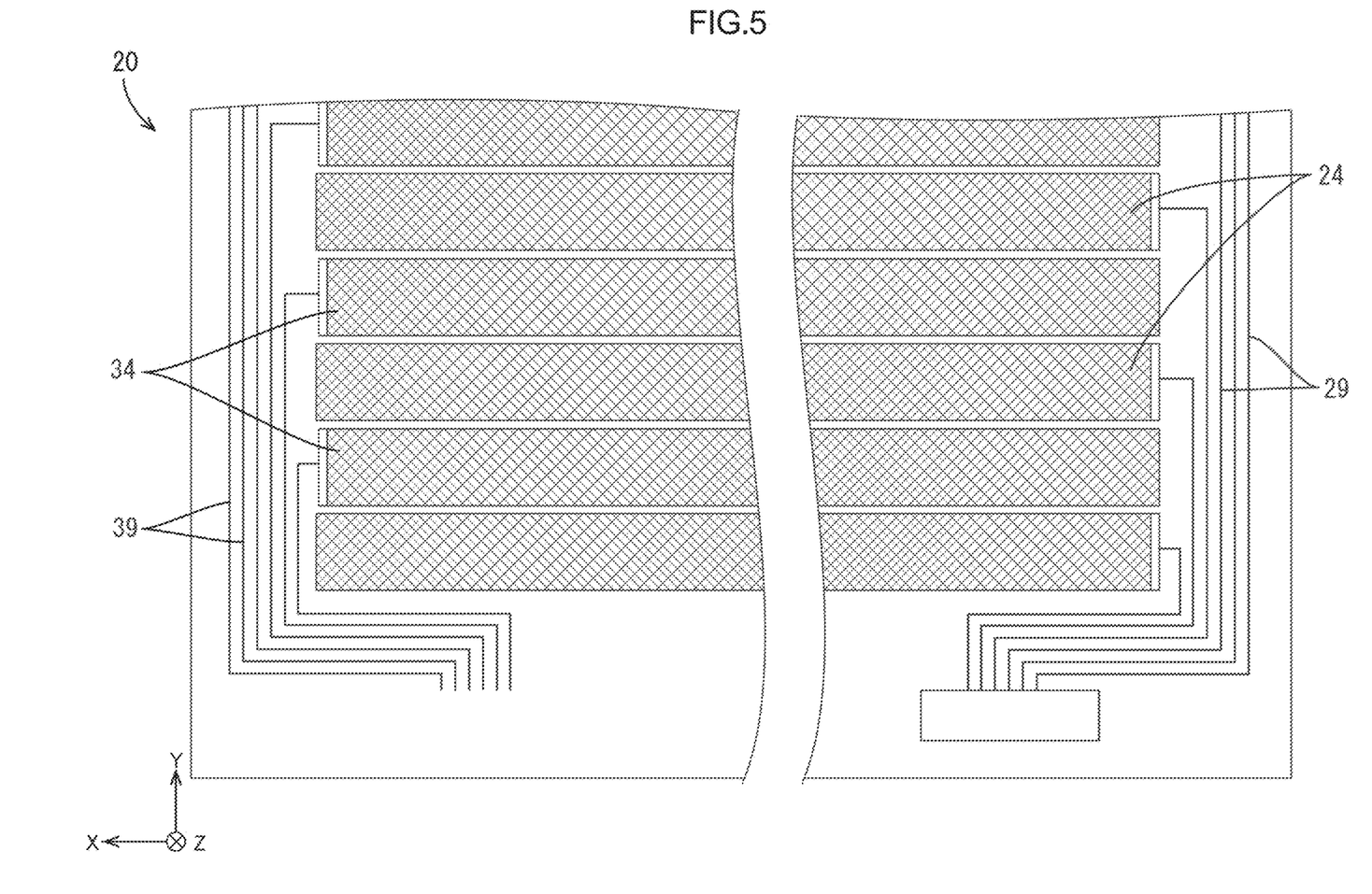
FIG. 5 is a bottom view illustrating a schematic structure of a back side of the touch panel.

The driving electrodes 24 have, like the detection electrodes 22, a meshed shape formed of thin lines of metal with excellent conductivity, such as copper, silver, aluminum, molybdenum, titanium, or tungsten. In addition, the dummy driving electrodes 34 have a meshed pattern formed of thin lines of metal. The driving electrodes 24 and the dummy driving electrodes 34 are in the equivalent mode. The dummy driving electrodes 34 are preferably formed of the same kind of metal as that of the driving electrode 24; however, the material of the dummy driving electrodes 34 is not limited thereto. These driving electrodes 24 and dummy driving electrodes 34 can be formed by etching a metal film formed on a plate surface of the second transparent substrate 23 so as to pattern the metal film into a predetermined meshed pattern. Note that FIG. 5 schematically illustrates an example in which the driving electrodes 24 and the dummy driving electrodes 34 are formed to have a lattice mesh shape.

Each of the plurality of driving electrodes 24 has one end (right side in FIG. 5) in the long-side direction (X-axis direction) electrically connected to each of a plurality of driving terminals through each of the plurality of driving lines 29 (one example of counter electrode side line) provided in the non-touch area. The plurality of driving terminals are electrically connected to the control circuit board. The plurality of driving lines 29 are drawn in a manner of being extended from the center of the short side of the plurality of driving electrodes 24 with a belt-like shape to a direction perpendicular to the short side, bent, extended along the long-side direction of the touch panel 20, and collected to one end side in the long-side direction (lower side in FIG. 5). By such a structure, in the length direction of the touch panel 20, the driving line 29 that is connected to the driving electrode 24 disposed on the upper side in FIG. 5 is longer, while the driving line 29 that is connected to the driving electrode 24 disposed on the lower side in FIG. 5 is shorter. Note that the driving lines 29 are preferably formed of the same metal material as that of the driving electrodes 24; however, the material of the driving lines 29 is not limited thereto.

The plurality of dummy driving electrodes 34 are coupled to the plurality of dummy driving lines 39 (one example of counter electrode side dummy line) provided in the non-touch area at the end (left side in FIG. 5) on the side opposite to the side where the driving lines 29 are disposed in the long-side direction (X-axis direction). The plurality of dummy driving lines 39 are, like the driving lines 29, drawn in a manner of being extended from the center of the short side of the plurality of dummy driving electrodes 34 with a belt-like shape to a direction perpendicular to the short side, bent, extended along the long-side direction of the touch panel 20, and collected to one end side in the long-side direction. That is to say, in the length direction of the touch panel 20, the dummy driving line 39 that is coupled to the dummy driving electrode 34 disposed on the upper side in FIG. 5 is longer, while the dummy driving line 39 coupled to the dummy driving electrode 34 disposed on the lower side in FIG. 5 is shorter. Note that the dummy driving lines 39 are preferably formed of the same metal material as that of the dummy driving electrodes 34; however, the material of the dummy driving lines 39 is not limited thereto. The dummy driving lines 39 are not connected electrically.

These driving lines 29 and dummy driving lines 39 can be formed by, like the driving electrodes 24 and the dummy driving electrodes 34, etching a metal film formed on a plate surface of the second transparent substrate 23 so as to pattern the metal film into a predetermined pattern. Note that FIG. 5 schematically illustrates a wiring structure of the driving lines 29 and the dummy driving lines 39.

The length of one of the plurality of dummy driving lines 39 is the intermediate length between the lengths of the two driving lines 29 connected to the two driving electrodes 24 adjacent to the dummy driving electrode 34 coupled to the one dummy driving line 39. That is to say, assuming that the length of the driving line 29 connected to one of the driving electrodes 24 that is on the upper side in FIG. 5 in the length direction of the touch panel 20 is M1, the length of the dummy driving line 39 that is coupled to the dummy driving electrode 34 disposed below and adjacent to the driving electrode 24 is M2, and the length of the driving line 29 connected to the driving electrode 24 disposed below and adjacent to the dummy driving electrode 34 is M3, M1>M2>M3 is satisfied. Note that the plurality of driving lines 29 and the plurality of dummy driving lines 39 are set to have the same width.

These driving electrodes 24, driving lines 29, dummy driving electrodes 34, and dummy driving lines 39 have, on each surface thereof (surface opposite to the second transparent substrate 23), a black film formed by a blackening process. The black film is a metal oxide film formed by an oxidizing process or a metal film formed by a plating process.

The detection electrodes 22 and the driving electrodes 24, which are blackened, are disposed to overlap with each other in a manner that, to a surface (back surface) of the first transparent substrate 21 that is opposite to a surface (front surface) thereof provided with the detection electrodes 22 and the like, a surface of the second transparent substrate 23 that is provided with the driving electrodes 24 and the like is attached with a transparent adhesive, for example (see FIG. 2 and FIG. 3). In this case, the blackened surface of the detection electrodes 22, the detection lines 28, the dummy detection electrodes 32, the dummy detection lines 38, and the driving electrodes 24, the driving lines 29, the dummy driving electrodes 34, and the dummy driving lines 39 faces to the front side (opposite to the liquid crystal panel 11).

The liquid display device 10 according to the present embodiment has the structure as described above, and next, the operation and effect will be described.

The touch panel 20 according to the present embodiment includes: the plurality of detection electrodes 22 formed of meshed metal thin lines with the belt-like shape, extended along the first direction (Y-axis direction), and arranged with a space therebetween along the second direction (X-axis direction) that is orthogonal to the first direction; the detection lines 28 each electrically connected to the end of the detection electrode 22 in the first direction to receive a signal; the dummy detection electrodes 32 formed of meshed metal thin lines with the belt-like shape and each disposed in the space between the plurality of detection electrodes 22 that are adjacent; and the dummy detection lines 38 each coupled to the end of the dummy detection electrode 32 in the first direction in the electrically disconnected state. In the detection electrodes 22, the detection lines 28, the dummy detection electrodes 32, and the dummy detection lines 38, the front side (opposite to the first transparent substrate 21) in an XY plane including the first direction and the second direction is blackened.

By this structure, the total area of the detection electrodes 22 and the detection lines 28 connected thereto and the total area of the dummy detection electrodes 32 and the dummy detection lines 38 coupled thereto are close; therefore, when the blackening by the plating process is performed, the difference in degree of the blackening (dense or thin) between the detection electrodes 22 and the dummy detection electrodes 32 becomes smaller. That is to say, the touch panel 20 with excellent visibility and less bright and dark unevenness can be obtained.

The touch panel 20 includes the plurality of detection electrodes 22 and the plurality of dummy detection electrodes 32 with the same size. In this structure, the detection electrodes 22 and the dummy detection electrodes 32, which occupy relatively large area, have the equivalent area; therefore, when the blackening by the plating process is performed, the difference in degree of the blackening (dense or thin) between the detection electrodes 22 and the dummy detection electrodes 32 becomes smaller and the bright and dark unevenness is suppressed.

In the touch panel 20, the length of one of the dummy detection lines 38 is the intermediate length between the lengths of the two detection lines 28 connected to the two detection electrodes 22 adjacent to the dummy detection electrode 32 coupled to the one dummy detection line 38. In this structure, the area of the detection lines 28 and the dummy detection lines 38 that are adjacent to each other change gradually; therefore, when the blackening by the plating process is performed, the difference in degree of the blackening (dense or thin) between the detection electrodes 22 and the dummy detection electrodes 32 that are adjacent to each other becomes smaller and the bright and dark unevenness is suppressed.

In addition, in the touch panel 20, the detection electrodes 22, the detection lines 28, the dummy detection electrodes 32, and the dummy detection lines 38 are formed of the same metal material; therefore, the difference in degree of the blackening (dense or thin) becomes smaller and the bright and dark unevenness is suppressed.

In the touch panel 20, the detection line 28 and the dummy detection line 38 are respectively coupled to the end of the detection electrode 22 and the end of the dummy detection electrode 32 that are on opposite sides in the first direction. By this structure, the non-display area NAA of the liquid crystal panel 11 can be used efficiently and the liquid crystal display device 10 with a narrower frame can be provided.

The touch panel 20 includes: the plurality of driving electrodes 24 extended along the second direction so as to overlap with the detection electrodes 22 in plan view, arranged with a space therebetween along the first direction, forming the electrostatic capacitance between the driving electrodes 24 and the detection electrodes 22, and formed of meshed metal thin lines with a belt-like shape; the driving lines 29 each electrically connected to the end of the driving electrode 24 in the second direction to receive a signal; the dummy driving electrodes 34 formed of meshed metal thin lines with a belt-like shape and disposed in the space between the plurality of driving electrodes that are adjacent; and the dummy driving lines 39 each coupled to the end of the dummy driving electrode 34 in the second direction in the electrically disconnected state. In the driving electrodes 24, the driving lines 29, the dummy driving electrodes 34, and the dummy driving lines 39, the front side in the plane (opposite to the liquid crystal panel 11) is blackened.

By this structure, even if not just the detection electrodes 22 but also the driving electrodes 24 are formed of metal, the difference in degree of the blackening (dense or thin) of the driving electrodes 24 becomes smaller and the bright and dark unevenness is suppressed.

Furthermore, the liquid crystal display device 10 includes the liquid crystal panel 11 and the touch panel 20 with the aforementioned structure; therefore, the bright and dark unevenness is suppressed and the visibility is improved.

Other Embodiments

The technology disclosed herein is not limited to the embodiments described above with reference to the drawings and other embodiments to be described below are also included in the technical range, for example.

Figure 6:
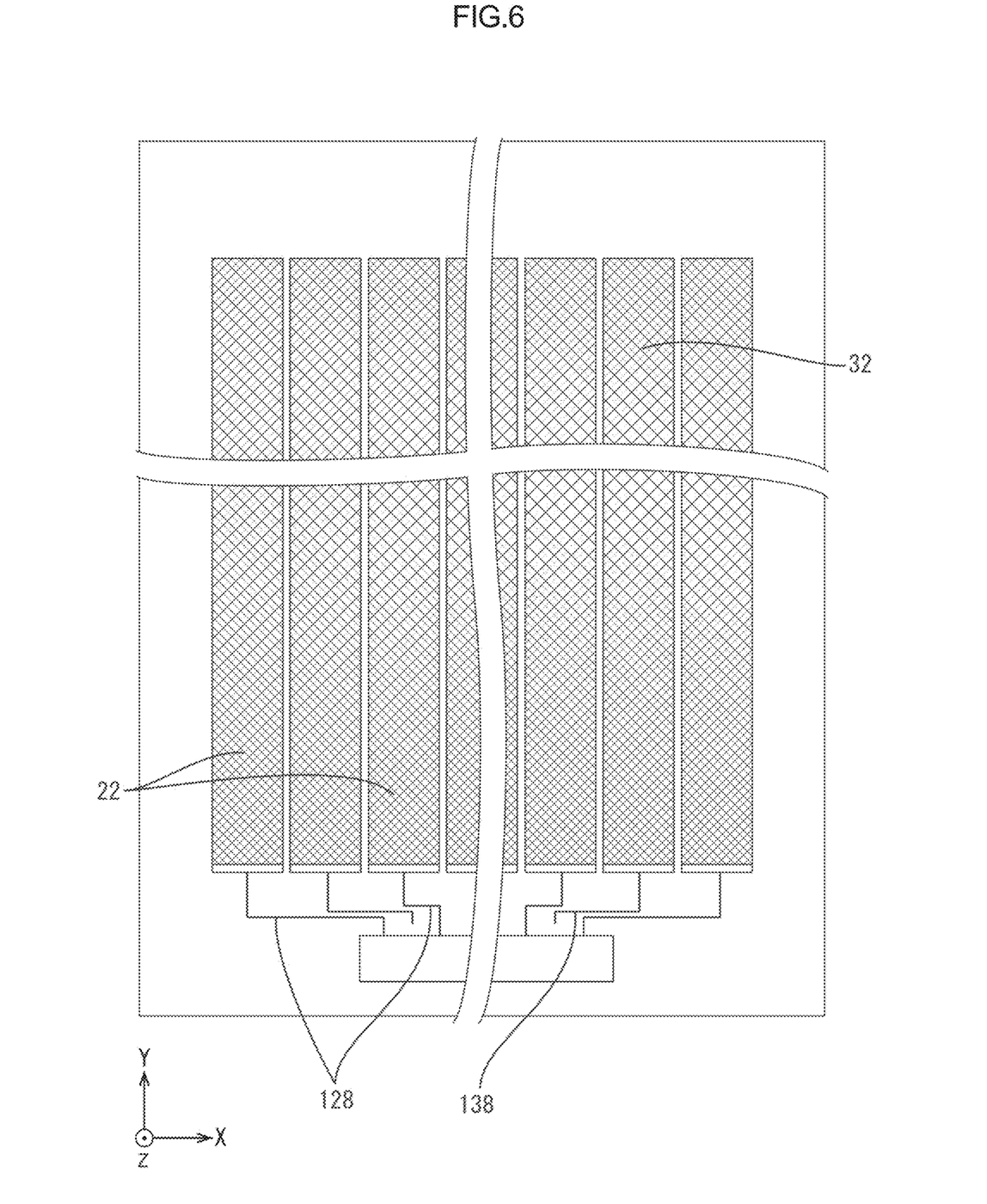
FIG. 6 is a plan view illustrating a schematic structure of a front side of a touch panel according to another embodiment.

(1) In the above embodiment, the detection line 28 and the dummy detection line 38 are respectively disposed at the end of the detection electrode 22 and the end of the dummy detection electrode 32 that are on opposite sides in the length direction (first direction). However, as illustrated in FIG. 6, detection lines 128 and dummy detection lines 138 may be disposed at the ends on the same side in the length direction (first direction). This similarly applies to the driving line 29 and the dummy driving line 39.

(2) In the above embodiment, one of the dummy detection lines 38 has the length that is intermediate between the lengths of two of the detection lines 28 connected to two of the detection electrodes 22 that are adjacent to the dummy detection electrode 32 coupled to the one dummy detection line 38. However, the length of the one dummy detection line 38 may be the same as the length of the detection line 28 connected to one of the two detection electrodes 22 adjacent to the dummy detection electrode 32 coupled to the one dummy detection line 38.

(3) In the above embodiment, both electrodes (detection electrodes 22 and driving electrodes 24) in the TPP pattern are formed of metal; however, just one of them may be formed of metal and this case is also included in the technical range disclosed herein.

(4) In the above embodiment, the electrode and the counter electrode in the technology disclosed herein are the detection electrode 22 and the driving electrode 24, respectively; however, the electrode and the counter electrode may be the driving electrode 24 and the detection electrode 22, respectively and this case is also included in the technical range disclosed herein.

(5) In the above embodiment, the detection electrodes 22, the detection lines 28, the dummy detection electrodes 32, and the dummy detection lines 38 are formed of the same metal material; however, these may be formed of different metal materials. This similarly applies to the driving electrodes 24, the driving lines 29, the dummy driving electrodes 34, and the dummy driving lines 39.

(6) In the above embodiment, the touch panel 20 is formed by attaching the electrodes 22 and 32 and the electrodes 24 and 34 formed on the two transparent substrates 21 and 23, respectively; however, the touch panel may be formed using the electrodes formed on both surfaces of one transparent substrate.

The invention claimed is:

1. A position input device comprising:
a plurality of electrodes made of metal with a belt shape, extended along a first direction, and arranged with a space therebetween along a second direction that is orthogonal to the first direction;
lines each electrically connected to one end of each of the electrodes in the first direction to receive a signal;
dummy electrodes made of metal with a belt like shape and each disposed in a space between the plurality of electrodes that are adjacent; and
dummy lines each coupled to an end of each of the dummy electrodes in the first direction in an electrically disconnected state with a controller, wherein
the electrodes, the lines, the dummy electrodes, and the dummy lines each include a front side surface and a back side surface in a plane along the first direction and the second direction, at least one of the front side surface and the back side surface being blackened,
the lines are connected to the controller,
the plurality of electrodes have a meshed pattern,
the dummy electrodes have a meshed pattern,
the lines extend from a short side of the plurality of electrodes, and
the dummy lines extend from a short side of the dummy electrodes.

2. The position input device according to claim 1, wherein the plurality of electrodes and the plurality of dummy electrodes have a same size.

3. The position input device according to claim 1, wherein one of the dummy lines has a length that is intermediate between lengths of two of the lines connected to two of the electrodes that are adjacent to the dummy electrode coupled to the one dummy line.

4. The position input device according to claim 1, wherein the electrodes, the lines, the dummy electrodes, and the dummy lines are formed of same metal material.

5. The position input device according to claim 1, wherein the dummy lines are respectively coupled to another ends of the dummy electrode that are opposite to the one end in the first direction.

6. The position input device according to claim 1, further comprising:
counter electrodes extended along the second direction so as to overlap with the plurality of electrodes in a plan view, arranged with a space therebetween along the first direction, forming electrostatic capacitance between the counter electrodes and the electrodes, and made of metal with a belt shape;
counter electrode side lines each electrically connected to an end of each of the counter electrodes in the second direction to receive a signal;
counter electrode side dummy electrodes made of metal with a belt shape and disposed in a space between the plurality of counter electrodes that are adjacent; and
counter electrode side dummy lines each coupled to an end of each of the counter electrode side dummy electrodes in the second direction in an electrically disconnected state with the controller, wherein
the counter electrodes, the counter electrode side lines, the counter electrode side dummy electrodes, and the counter electrode side dummy lines each include a front side surface and a back side surface in the plane, at least one of the front side surface and the back side surface being blackened, and
the counter electrode side lines are connected to the controller.

7. A display device with a position input function, comprising:
at least the position input device according to claim 1; and
a display panel.

8. The display device with a position input function according to claim 7, wherein the position input device and the display panel are overlapped with each other, and the electrodes, the lines, the dummy electrodes, and the dummy lines each have a blackened surface on a side opposite to a surface thereof facing the display panel.

* * * * *